June 15, 1954  R. G. STREUBER  2,681,122
ENERGIZATION SYSTEM FOR ELECTROSTATIC PRECIPITATORS
Filed March 10, 1953  2 Sheets-Sheet 1
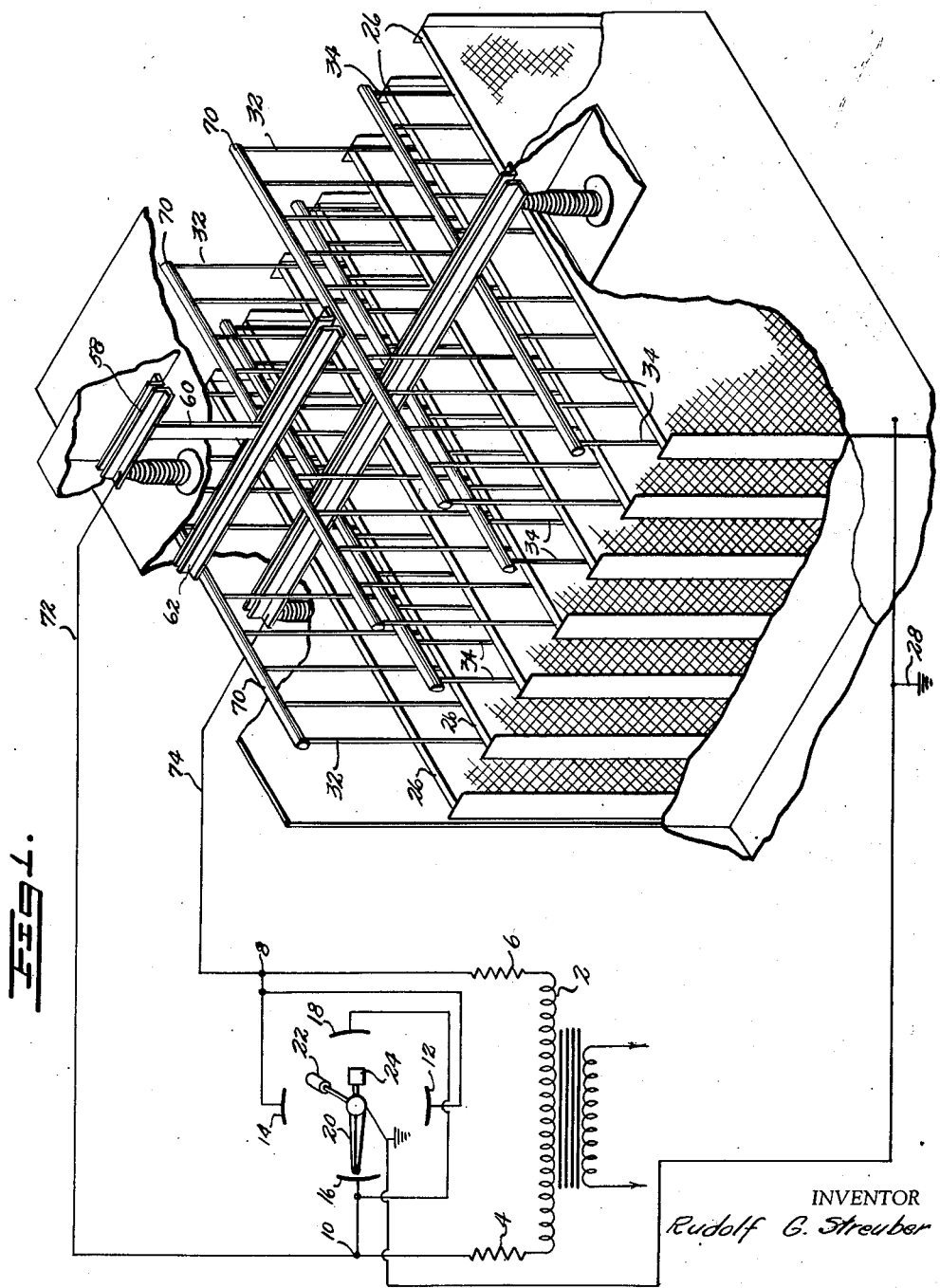
INVENTOR
Rudolf G. Streuber
BY Harold T. Stowell
ATTORNEY

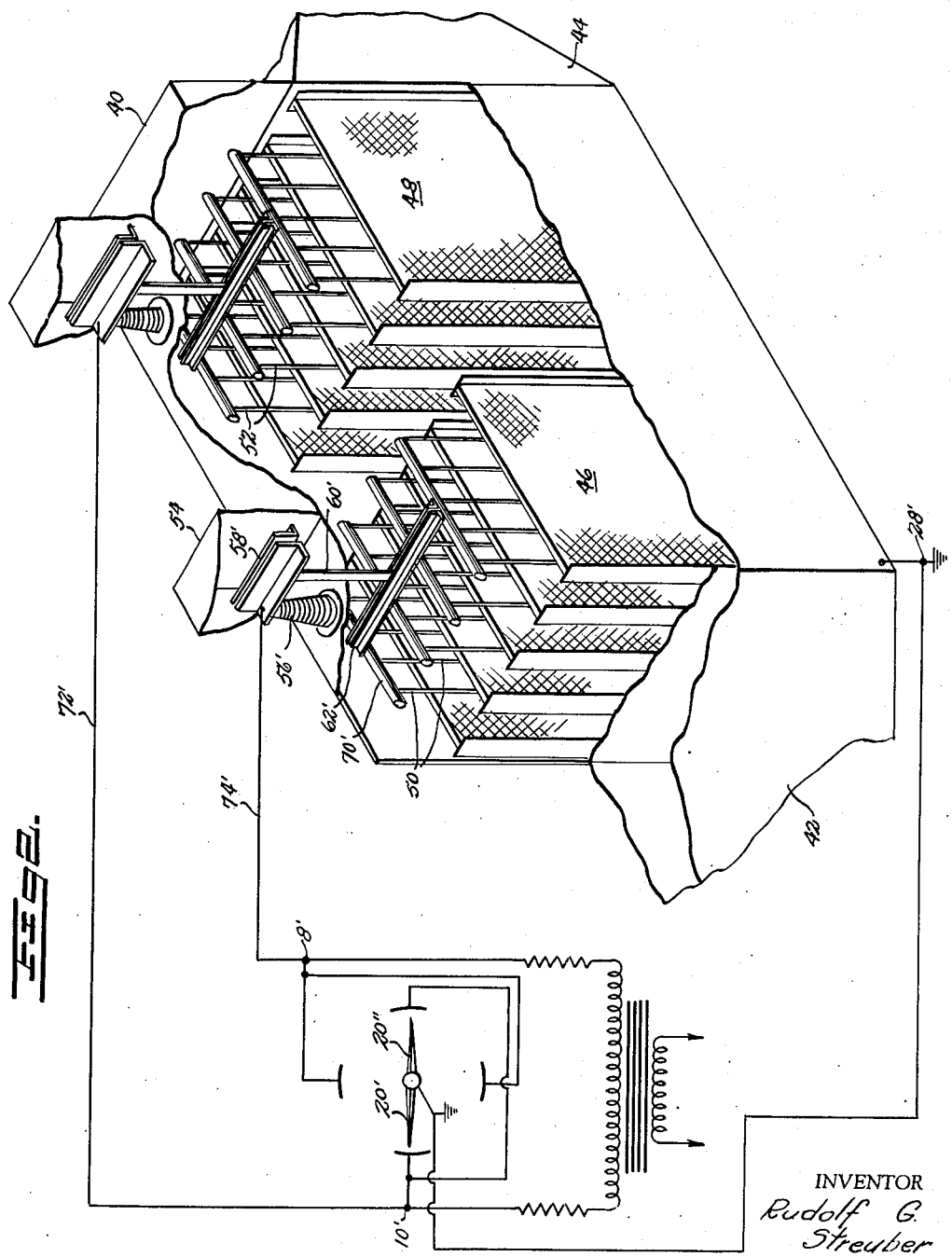

Patented June 15, 1954

2,681,122

UNITED STATES PATENT OFFICE 2,681,122

ENERGIZATION SYSTEM FOR ELECTROSTATIC PRECIPITATORS

Rudolf G. Streuber, Somerville, N. J., assignor to Research Corporation, New York, N. Y., a corporation of New York Application March 10, 1953, Serial No. 341,439

7 Claims. (Cl. 183—7)

This invention relates to an improved rectification and energization system for electrostatic precipitators, and has for its primary object the provision of an improved system, particularly for a precipitator employing mechanical rectification, of simple and rugged construction and high efficiency of operation.

In the conventional form of mechanical rectifier for "half-wave" operation, a motor operating at synchronous speed is equipped with two rotors and two stators, each stator consisting of a number of shoes attached to insulating supports. The one stator which may be considered the rectifier carries a number of shoes corresponding to the number of poles in the rotor, which is usually four. The other stator which in this case may be considered a synchronous switch is usually equipped with three shoes. Under these circumstances, the transformer EMF must force the current through six "rotor tip-to-stator shoe" gaps in its complete circuit from one transformer terminal to the other, with consequent considerable losses in voltage and power.

In accordance with the present invention, a system of rectification and precipitator energization is proposed which not only reduces these "tip-to-stator-shoe" losses in a mechanical rectifier very greatly, but which also provides for a very much simplified apparatus, both mechanically and electrically, and removes nearly all sources of mechanical and electrical failure which experience has proven to affect adversely both the safety and economy of precipitator operation.

In the usual application of "half-wave" energization, power is applied during one-half of the A.-C. wave to a precipitator section while the entire section connected for energization on the other half of the A.-C. wave, is disconnected during that period. Therefore, both surfaces of the collecting electrodes are inactive at that time. In accordance with one form of the invention described below, opposite surfaces of the collecting electrodes are energized by alternate half-waves of the alternating current source. This has the advantage that one surface or the other of each collecting electrode is always energized. On the other hand, the improved system shown can be applied alternately to different sections of a precipitator as described above, if desired. In either case, the advantage is gained according to the improved system, that the opposing electrodes are grounded together and thus are brought to the same polarity every other half cycle. This aids in the removal of the precipitate from the electrodes, since it eliminates all traces of residual charge from the electrodes during this phase of the operation.

The conventional mechanical high voltage rectifier for precipitator service is relatively low in cost and has practically no current limitations as compared to electronic tube rectifiers. However, it does have some major disadvantages. For example, there is danger of breakage of the jumper wires used in the rotating parts of such machines, which at the necessarily high speeds employed may wreck the entire machine. My invention eliminates the need for such jumper wires and therefore eliminates this danger. Furthermore, the rotor arms or discs according to conventional practice are necessarily made of insulating material, and are accordingly subject to mechanical or electrical failure which is also likely to cause extensive damage. Since the rotating elements according to the present invention do not need to be insulated, this danger is also avoided. Another advantage of the present invention is that only a single gap is required between the rotating and the stationary parts of the rectifier. Therefore, the voltage and power losses in the multiple gap arrangements of the prior art are avoided.

The specific nature of the invention, as well as other objects and advantages thereof, will clearly appear from a description of a preferred embodiment as shown in the accompanying drawings in which:

Fig. 1 shows a perspective view, partly broken away, of a duct precipitator employing a particular electrode arrangement and energized by one form of mechanical rectifier according to the invention; and Fig. 2 shows a perspective view, partly broken away, of a different electrode arrangement and energized by another form of rectifying means according to the invention.

The fundamental principle of the invention is shown in Fig. 1, wherein a source of high voltage current represented by the transformer secondary, 2, is connected through the usual current limiting resistances 4 and 6 to terminals 8 and 10, respectively. Terminal 8 is connected to diametrically opposed circumferentially arranged stationary shoes 12 and 14, while terminal 10 is similarly connected to alternately disposed stationary shoes 16 and 18. A single uninsulated rotating arm of conducting material, 20, is driven synchronously by a suitable small A.-C. 4-pole motor 22, to correspond to the stator shoes so as to successively and alternately provide a low resistance current path to the stator shoes in synchronism with the reversals of alternating current. Rotor arm 20 is suitably counterbalanced as indicated at 24, so that the system will rotate freely and easily without undue strain on the bearings. Rotating arm 20 is suitably connected to the collector electrodes 26 of a precipitator system, which may be grounded at 28 if desired. Since it is unnecessary to insulate the rotor arm 20 from ground, a conducting bearing with graphite bushing may be employed, or alternatively, a conventional sliding contact, such as a graphite ball in a spring socket, may be employed, the point of contact coinciding with the center of motor shaft if desired to reduce the relative motion to a minimum. The discharge electrodes 32 in alternate ducts formed by collector plates 26 are connected via high-tension member 70, horizontal conductor 62, vertical conductor 60, bust 58 and lead 72 to terminal 10, while intermediate discharge electrodes 34 are correspondingly connected to terminal 8 via conductor 74. In operation the rotor arm is aligned so that its tip is adjacent to a stator shoe having at that instant the desired polarity, usually positive. There is thus only one active gap in the rectifier. Since half the total number of banks of discharge electrodes, in alternate ducts, are connected directly to one end of the high voltage winding, 2, of the transformer, and the other half to the other end of the transformer winding, it will be seen that in operation, full transformer potential exists between the two sets of electrodes, and they are always at opposite polarity. In Fig. 1, the upper connection from the transformer end is shown as having instantaneous positive polarity. Through the rotor 20 the collecting plates are connected to this upper terminal 10 which is thus grounded through the single gap. The discharge electrodes 32, connected solidly to upper terminal 10, are therefore also at positive polarity and grounded in like manner, resulting in like polarity and very nearly equal potential of the discharge wires and the grounded plates in the corresponding ducts so that no electrical action of any kind takes place in the ducts in which discharge electrodes 32 are located. The other banks of discharge electrodes, 34, however, are solidly connected to the lower end 8 of transformer high voltage winding so that they are at this instant energized at negative polarity with the full transformer potential output between them and the sides of the collecting plates facing them. One hundred and eighty degrees later polarity is reversed, but the rotor arm has advanced to the next shoe, again maintaining positive polarity on the plates. Now, the lower end of the transformer winding 8 is grounded through the gap and with it the banks of discharge electrodes connected to it, while the upper end 10 of the winding is negative, as are the discharge electrodes 32 connected to it. Therefore, full potential at correct polarity exists in the adjacent ducts so that each alternate group of ducts is operated half-wave, the precipitator or precipitator section as a whole full wave. With only one gap in the circuit, voltage and power losses are reduced to a minimum. The circuit between discharge electrodes and transformer is never broken so that they remain active to the lowest value at which their charge can maintain a corona current. There is only one gap to give rise to radio or other interference. The material of the rotor arm is solid metal, eliminating virtually all danger from burning through or failing mechanically and there are no jumper wires, which constitute probably the major danger of mechanical breakage.

In the alternative form of the rectifier as illustrated in Fig. 2, the counterweight is replaced by a straight line extension 20'' of the rotor arm 20'. This provides two rotor arms at 180° mechanical displacement, thus insuring more perfect balance of the rotating elements, but principally placing two gaps in parallel in the circuit and so tending to reduce losses still further. In Fig. 2, a different form of precipitator electrode arrangement is shown from that of Fig. 1. Casing 40, provided with respective inlet and outlet gas passages 42 and 44, contains two banks of grounded collector electrodes 46 and 48, which, since they are grounded to the casing, may be mechanically fastened thereto in any suitable manner. Discharge electrode bank 50 is provided for collector bank 46 and discharge electrode bank 52 is provided for collector bank 48. A housing 54 is provided for an insulator system of which only insulator 56' is shown, which supports horizontal main bus 58', which in turn supports conducting members 62' by means of vertical conducting members 60', which in turn carry longitudinally extending high-tension members 70'. These high-tension members 70' support the longitudinally extending banks of vertical discharge electrodes 50 which may be of conventional type.

Electrodes 52 are supported in identical manner and are electrically connected to conductor 72' which leads to terminal 10' of the rectifier, while discharge electrodes 50 connected through leads 74' to terminal 8' of the rectifier. The casing is grounded at 28'. It will be apparent that the high-voltage transformer and rectifier shoe connections are similar to those shown in Fig. 1.

The operation of the system shown in Fig. 2 is very similar to that shown in Fig. 1, except of course that all of the discharge electrodes 50 will be energized simultaneously, while all of electrodes 52 are grounded, and vice versa. An advantage of this arrangement is that during every other half cycle, the opposing electrodes of each group are brought to the same polarity, including both sides of each collector plate electrode 46 or 48 respectvriely, which aids in the removal of the precipitate from the electrodes, since no residual charge remains on any of the electrodes 46 or 48 at this time.

It will be apparent that the embodiments shown are only exemplary and that various modifications can be made in construction and arrangements within the scope of my invention as defined in the appended claims.

I claim:

1. An electrical precipitator comprising a plurality of parallel collector plate electrodes; discharge electrodes between said plate electrodes, said discharge electrodes being connected to opposite sides of a high-voltage source, a connection from each of said sides to at least one of alternately arranged terminals of a rectifier switch having a movable switch arm electrically connected to a stationary terminal; a connection from said last terminal to said collector plate electrodes; and synchronous driving means operative to successively connect said switch arm to alternate ones of said alternately arranged terminals.

2. The invention recited in claim 1 wherein said switch arm is a rotating conducting member having conductive bearing means, said stationary terminal being connected to said bearing means.

3. The invention recited in claim 2, said rotating member having two arms extending in opposite directions from said bearing means, a plurality of stationary pole shoes circumferentially arranged in pairs for engagement by said rotating members during rotation thereof, the members of each said pair being electrically connected and diametrically located for simultaneous respective engagement by said two arms, alternate pairs being connected to opposite sides of said A.-C. source.

4. In an electrical precipitator having a plurality of spaced collector electrodes and a plurality of discharge electrodes intermediate the respective collector electrodes, a charging system comprising a high voltage A.-C. source having terminals of opposite polarity, a connection from each of said terminals to certain of said discharge electrodes, a connection from each of said terminals to at least one of alternately arranged terminals of a rectifier switch having a movable switch arm electrically connected to a stationary terminal; a connection from said last terminal to said collector electrodes; and synchronous driving means operative to successively connect said switch arm to alternate ones of said alternately arranged terminals.

5. In an electrical precipitator system having a plurality of spaced parallel collector electrodes forming the walls of ducts therebetween and discharge electrodes in said ducts, a charging system comprising a high voltage A.-C. source having terminals of opposite polarity, a connection from one of said terminals to the discharge electrodes in certain ones of said ducts, a connection from the other of said terminals to the discharge electrodes in the other ones of said ducts, a connection from each of said terminals to at least one of alternately arranged terminals of a rectifier switch having a movable switch arm electrically connected to a stationary terminal; a connection from said last terminal to said collector electrodes; and synchronous driving means operative to successively connect said switch arm to alternate ones of said alternately arranged terminals.

6. The invention recited in claim 5, said duct means comprising two groups of ducts, the ducts of each respective group being adjacent each other, the discharge electrodes of one group being all connected to the same terminal of the A.-C. source and those of the other group being connected to the opposite terminals of the A.-C. source.

7. The invention recited in claim 5, the discharge electrodes of alternating duct means being connected to each other and to respective terminals of the A.-C. source.

References Cited in the file of this patent

UNITED STATES PATENTS

| Number | Name | Date |
|---|---|---|
| 2,000,654 | Wintermute | May 7, 1935 |

FOREIGN PATENTS

| Number | Country | Date |
|---|---|---|
| 541,467 | Germany | Mar. 26, 1931 |